United States Patent
Kim et al.

(10) Patent No.: US 11,203,236 B2
(45) Date of Patent: Dec. 21, 2021

(54) TIRE SENSOR FIXED IN SCREWING MANNER AND TIRE HAVING THE SAME

(71) Applicant: Hankook Tire & Technology Co., Ltd., Seoul (KR)

(72) Inventors: Jeong Heon Kim, Daejeon (KR); Chang Hyo Hong, Daejeon (KR)

(73) Assignee: Hankook Tire & Technology Co., Ltd., Seoul (KR)

( * ) Notice: Subject to any disclaimer, the term of this patent is extended or adjusted under 35 U.S.C. 154(b) by 0 days.

(21) Appl. No.: 16/538,674

(22) Filed: Aug. 12, 2019

(65) Prior Publication Data

US 2020/0047566 A1  Feb. 13, 2020

(30) Foreign Application Priority Data

Aug. 13, 2018 (KR) .......................... 10-2018-0094637

(51) Int. Cl.
*B60C 23/04* (2006.01)
*B60C 23/20* (2006.01)

(52) U.S. Cl.
CPC ...... *B60C 23/0455* (2013.01); *B60C 23/0488* (2013.01); *B60C 23/0493* (2013.01); *B60C 23/20* (2013.01)

(58) Field of Classification Search
CPC ............ B60C 23/0455; B60C 23/0488; B60C 23/0493; B60C 23/20; B60C 2019/004; B29D 2030/0077; B29D 2030/0072
USPC ................. 340/442–447; 73/146; 356/237.2; 701/33.6

See application file for complete search history.

(56) References Cited

U.S. PATENT DOCUMENTS

| | | | | |
|---|---|---|---|---|
| 5,864,056 A | * | 1/1999 | Bell | ........................ B60C 11/24 73/146 |
| 5,877,679 A | * | 3/1999 | Prottey | ............... B60C 23/0493 340/442 |
| 6,105,423 A | * | 8/2000 | Prottey | ............... B60C 23/0493 340/442 |

(Continued)

FOREIGN PATENT DOCUMENTS

| | | |
|---|---|---|
| JP | 2003-511286 A | 3/2003 |
| JP | 2009-035242 A | 2/2009 |
| KR | 10-1846207 B1 | 5/2018 |

OTHER PUBLICATIONS

Korean Office Action for application No. 10-2018-0094637 dated Oct. 30, 2019.

*Primary Examiner* — Daryl C Pope
(74) *Attorney, Agent, or Firm* — Knobbe, Martens, Olson & Bear, LLP

(57) ABSTRACT

The disclosed technology generally relates to a tire sensor and more particularly to a tire sensor configured to be fixed to a tire in a screwing manner, and a tire having the same. In one aspect, a tire sensor configured to be fixed to a tire in a screwing manner includes a sensor module configured to be attached to an inner surface of a tread of a pneumatic tire to detect conditions of the tire, a sensor casing formed to surround the sensor module, and a sensor fixture including a fixing screw to fixedly attach the sensor casing to the inner surface of the tread of the tire in a screwing manner by turning the fixing screw. In another aspect, a tire includes the tire sensor fixedly attached in a screwing manner therein for detecting tire conditions.

20 Claims, 4 Drawing Sheets

(56) References Cited

U.S. PATENT DOCUMENTS

| | | | | |
|---|---|---|---|---|
| 6,539,295 | B1 * | 3/2003 | Katzen | B60C 23/064 |
| | | | | 701/33.6 |
| 7,119,896 | B2 * | 10/2006 | Godeau | B60C 11/24 |
| | | | | 356/237.2 |
| 2003/0058118 | A1 * | 3/2003 | Wilson | B60C 23/0423 |
| | | | | 340/679 |
| 2011/0240195 | A1 * | 10/2011 | Ellmann | B29D 30/0061 |
| | | | | 152/450 |
| 2017/0001483 | A1 | 1/2017 | Sabatini et al. | |

* cited by examiner

TIRE SENSOR FIXED IN SCREWING MANNER AND TIRE HAVING THE SAME

INCORPORATION BY REFERENCE TO ANY PRIORITY APPLICATIONS

This application claims foreign priority to Korean Patent Application No. 10-2018-0094637, filed Aug. 13, 2018, the content of which is incorporated by reference herein in its entirety.

BACKGROUND

Field

The disclosed technology generally relates to a tire sensor and more particularly to a tire sensor configured to be attached to an inner surface of a tire and a tire having the same, and even more particularly to a tire sensor having a fixing screw, which is fixed to an inner surface of a tire in a screwing manner to ensure strong durability of attachment, and a tire having the same.

Description of the Related Art

In the upcoming era of autonomous driving, some vehicles may travel on the road by themselves without being directly driven by a driver. Thus, sensors, instead of the driver, may directly detect a tire behavior or a road surface condition during the traveling of the vehicle and provide warning signals or continuously provide information to a vehicle controller and/or a road control system.

Accordingly, a sensor for detecting temperature, air pressure, acceleration, or the like may be attached in tire. However, it is very difficult to maintain the durability of attachment of the sensor to the tire because the tire may be subjected to repeated deformation and temperature fluctuations while the vehicle is traveling. In this regard, a technology to ensure the durability of sensor attachment may increasingly become a core technology relating to future tires.

An existing attachment method of a sensor to an inner surface of a tire is mainly performed in such a manner that the sensor is fixed by applying an adhesive or a sticking agent thereto after the bottom surface of the sensor is widely formed. However, in such an attachment method, there is a high risk that the sensor is inadvertently detached from the tire due to heating and repeated distortion of the tire, particularly, when the vehicle travels at a high speed.

When the sensor is detached from the inner surface of the tire, the function of the tire itself may be lost, and the inner surface of the tire is ground and the inside thereof is damaged due to the movement of the detached sensor during the acceleration/deceleration of the tire, which may lead to secondary accidents due to punctures or the like. Therefore, there is a need for a sensor fixing technique that provides strong and durable attachment to prevent these issues.

U.S. Patent Application Publication No. 2017-0001483 (entitled "TYRE SENSOR DEVICE") discloses a technique for measuring air pressure, pressure, and acceleration signals by attaching a tire pressure monitoring system (TPMS) sensor, which is a tire pressure alarm device having a pneumatic valve attached thereto, to a tire's inner surface and adding functions.

Korean Patent No. 10-1846207 (entitled "TIRE-ATTACHED TIRE SENSOR) discloses a technique for providing a tire-attached tire sensor, which has a compact structure and is directly attachable to a tire, and for communicating with an external terminal to receive tire detection information through the terminal.

The above documents disclose techniques for detecting temperature, air pressure, acceleration, etc., by attaching the tire condition sensor to the inner surface of the tire, but do not disclose a technique for preventing the detachment of the sensor by ensuring the durability of attachment of the sensor.

Therefore, in view of the technical significance of the sensor itself for tire condition monitoring which is an essential control element in the traveling of the vehicle, and the stability through prevention of secondary accidents which may occur due to the detachment of the sensor, the disclosed technology is directed to a technology for attaching a tire sensor having a fixing screw.

SUMMARY OF CERTAIN INVENTIVE ASPECTS

It is an object of the disclosed technology to provide a tire sensor having a fixing screw, the durability of attachment of which can be enhanced by turning the screw and fixing the tire sensor to an inner surface of a tire in a screwing manner.

The present invention is not limited to the above-mentioned object, and other objects of the present invention can be clearly understood by those skilled in the art to which the present invention pertains from the following description.

To accomplish the above object, in accordance with one aspect of the disclosed technology, there is provided a tire sensor fixed in a screwing manner, which includes a sensor module attached to an inner surface of a tread of a tire to detect conditions of the tire, a sensor casing formed to surround the sensor module, and a sensor fixture including a fixing screw to attach the sensor casing to the inner surface of the tread of the tire, wherein the fixing screw is turned in a screwing manner to fixedly attach the sensor casing to the inner surface of the tread of the tire.

In an embodiment of the disclosed technology, the fixing screw may have a screw head attached to a lower surface of the sensor casing.

In an embodiment of the disclosed technology, the fixing screw may have a screw head inserted into the sensor casing so that the fixing screw is formed integrally with the sensor casing.

In an embodiment of the disclosed technology, one of an adhesive, a sticking agent, and a sealant may be additionally coated on a lower surface of the sensor casing and a surface of the sensor fixture.

In an embodiment of the disclosed technology, the fixing screw may have a screw body formed to completely pass through the tread of the tire.

In an embodiment of the disclosed technology, the sensor fixture may further include a female screw on an outer surface of the tread of the tire, and the female screw may be fastened to the screw body of the fixing screw protruding through the tread.

In an embodiment of the disclosed technology, the fixing screw may have a screw head formed to have one of circular, elliptical, polygonal, star-like, and serrated shapes, so that the sensor casing fits in with the fixing screw when the fixing screw is inserted into or removed from the tread of the tire.

In an embodiment of the disclosed technology, the sensor fixture may be made of metal or high-hardness plastic.

In an embodiment of the disclosed technology, the fixing screw may have a thickness dimension of 1 mm to 5 mm.

In an embodiment of the disclosed technology, the tire sensor may further include a fixing screw support on the inner surface of the tread of the tire, and after the fixing screw support is preliminarily attached to the inner surface of the tread of the tire, the sensor casing may be fixedly attached to the fixing screw support by the fixing screw of the sensor fixture.

In an embodiment of the disclosed technology, the fixing screw support may consist of two or more fixing screw supports formed on sides of the sensor casing.

In an embodiment of the disclosed technology, the fixing screw support may be attached to the inner surface of the tread of the tire using one of an adhesive, a sticking agent, and a sealant.

In an embodiment of the disclosed technology, the fixing screw support may be attached to the inner surface of the tread of the tire by rubber heating and curing.

To accomplish the above object, in accordance with another aspect of the disclosed technology, there is provided a tire having a tire sensor fixedly attached in a screwing manner therein for detecting tire conditions, wherein the tire sensor is one of the tire sensors fixed in a screwing manner according to the embodiments of the disclosed technology.

DETAILED DESCRIPTION OF CERTAIN ILLUSTRATIVE EMBODIMENTS

Figure 1:
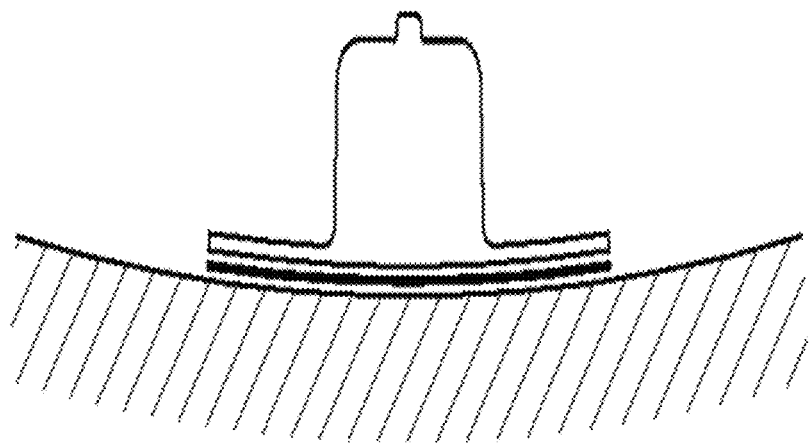
FIG. 1 is a cross-sectional view illustrating a conventional method of attaching a sensor to an inner surface of a tire by applying an adhesive or a sticking agent to the bottom surface of the sensor.

Reference will now be made in detail to exemplary embodiments of the present invention, examples of which are illustrated in the accompanying drawings. The present invention may, however, be embodied in different forms and should not be construed as limited to the embodiments set forth herein. For clear explanation of the present invention, parts irrelevant to the description may be omitted in the drawings, and like reference numerals refer to like parts throughout the specification.

In the whole specification, it will be understood that when an element is referred to as being "connected (joined, contacted, or coupled)" to another element, it can be "directly connected" to the other element or it can be "indirectly connected" to the other element with other elements being interposed therebetween. In addition, it will be understood that when a component is referred to as "comprising or including" any component, it does not exclude other components, but can further comprise or include the other components unless otherwise specified.

The terminology used in the present disclosure is for the purpose of describing particular embodiments only and is not intended to limit the invention. As used in the disclosure and the appended claims, the singular forms "a", "an" and "the" are intended to include the plural forms as well, unless context clearly indicates otherwise. It will be further understood that the terms "comprises/includes" and/or "comprising/including" when used in this specification, specify the presence of stated features, integers, steps, operations, elements, components, and/or groups thereof, but do not preclude the presence or addition of one or more other features, integers, steps, operations, elements, components, and/or groups thereof.

Hereinafter, exemplary embodiments of the present invention will be described in detail with reference to the accompanying drawings.

In the era of future autonomous driving, a tire sensor may directly detect tire or road surface conditions while a vehicle is traveling and control the vehicle or the tire or continuously provide information to a road control system.

Accordingly, a sensor for detecting temperature, air pressure, acceleration, or the like may be attached to a tire. However, it is very difficult to attach the sensor while the sensor has strong durability since repeated severe deformation and temperature rise occur in the tire while the vehicle is traveling.

To solve this issue, some sensor attachment methods have been used in such a manner that the sensor is fixed to the inner surface of the tire by applying an adhesive or a sticking agent thereto after the lower surface of the sensor is widely formed, as illustrated in FIG. 1.

However, in the application of such methods, there is a risk that the sensor may be detached from the tire due to heating and/or repeated distortion of the tire, particularly, when the vehicle travels at a high speed. When the sensor is detached from the tire, the function of the sensor itself may be lost, and the inside of the detached tire may be damaged due to the movement of the detached sensor during the acceleration/deceleration of the tire, which may lead to secondary accidents such as punctures.

Therefore, the disclosed technology proposes a technology on a tire sensor having a fixing screw for making it stronger and more durable in fixing the sensor to the inner surface of the tire.

FIGS. 2 to 5 illustrate a state in which a tire sensor fixed in a screwing manner is attached to an inner surface of a tread 10 of a tire according to an embodiment of the disclosed technology.

Figure 2:
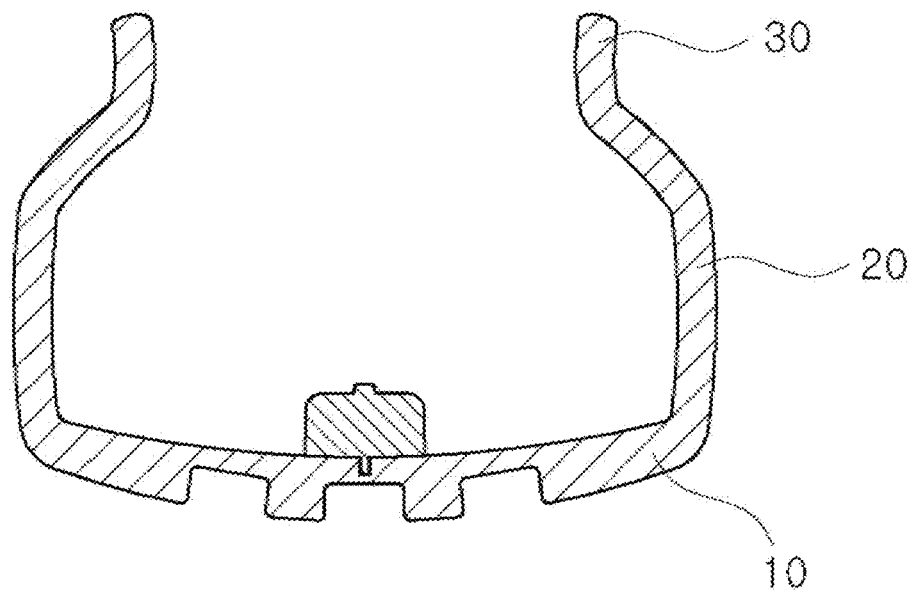
FIG. 2 is a schematic view illustrating a tire sensor attached to an inner surface of a tread of a tire according to an embodiment of the disclosed technology.

As illustrated in FIG. 2, the basic structure of the tire includes a tread 10 that comes into direct contact with the road surface, a sidewall 20 that serves to protect a carcass corresponding to the frame of the tire and imparts ride comfort to a vehicle, and a bead 30 that serves to fixedly couple the tire to a wheel.

The tire sensor according to the embodiment of the disclosed technology includes a sensor module 100 attached to the inner surface of the tread 10 of the tire to detect the conditions of the tire and the road surface, a sensor casing 200 formed to surround the sensor module 100 to protect the sensor module 100, and a sensor fixture 300 including a fixing screw 310 and serving to fixedly attach the sensor casing 200 on the inner surface of the tread 10 of the tire in a screwing manner or a torsional manner by turning the screw such that the screw at least partly penetrates the tread of the tire.

The fixing screw 310 includes a screw head 311 serving to fix the sensor casing 200 and a screw body 312 inserted into the tread 10. The screw body 312 has a thread formed thereon so as to be suitable for insertion into the tread 10.

The sensor module 100 includes a sensing module comprising mechanical and/or electrical components and the associated circuitry including one or more of a PCB substrate, a transmission/reception antenna, an electric energy supply, and the like therein. Thus, the sensor module 100 comprises a means for measuring one or more of the air pressure, temperature, and acceleration of the tire, and perform data collection and wireless transmission and reception. In addition, the sensor module 100 may include an energy supply element for supply of energy or may be connected to a separate energy supply element by wire.

The sensor module 100 is directly inserted into the tire corresponding to each of front and rear wheels of the vehicle to detect the air pressure state and the temperature change of the tire during traveling and to collect information and provide it to the driver visually and audibly.

The fixing screw 310 has an appropriate thickness dimension so as not to cut the wire of a tire reinforcing belt during its mounting. The tire reinforcing belt is a component that determines the grip force on the road surface to determine the handling performance and ride comfort of the vehicle, from among the components having the greatest influence on the tread of the tire.

Therefore, in order to prevent the wire of the tire reinforcing belt from being cut while ensuring the durability of attachment of the sensor, it is preferable that the screw body 312 has a thickness dimension of 1 mm to 5 mm.

However, when the fixing screw 310 is inserted into or removed from the tread 10 to attach or detach the sensor to or from the inner surface of the tire, there may be caused a side effect that the sensor casing 200 does not fit in with the fixing screw 310.

In order to solve this issue, the screw head may be formed to have a circular, elliptical, polygonal, star-like, or serrated shape or the like, according to an embodiment of the disclosed technology. The screw head refers to a wide end of the screw with a variety of shapes and grooves.

In this case, since the coupling force between the sensor casing 200 and the fixing screw 310 is increased even in the process of inserting or removing the fixing screw 310 into or from the tread, it is possible to prevent a problem that the sensor casing does not fit in with the fixing screw.

Figure 3:
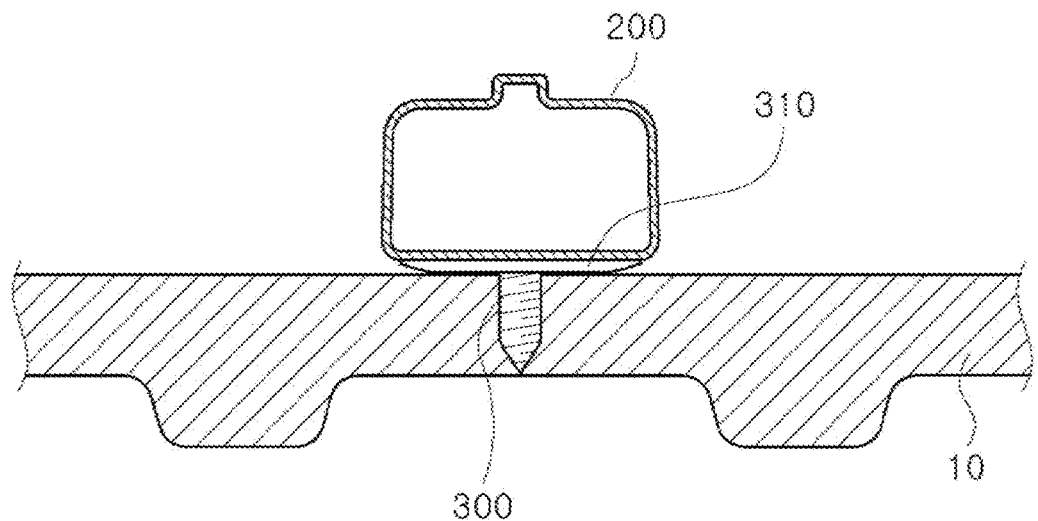
FIG. 3 is a cross-sectional view illustrating a tire sensor in which a fixing screw is attached to a lower portion of a sensor casing according to an embodiment of the disclosed technology.

As illustrated in FIG. 3, according to an embodiment of the disclosed technology, the screw head may be attached to the lower surface of the sensor casing 200 using an adhesive or a sticking agent.

Figure 4:
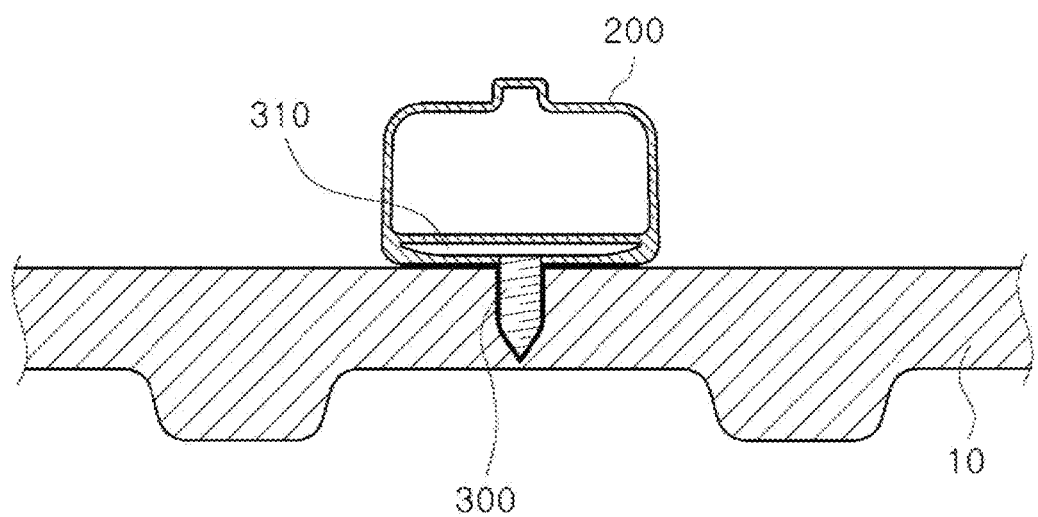
FIG. 4 is a cross-sectional view illustrating a tire sensor in which a fixing screw is formed integrally with a sensor casing according to an embodiment of the disclosed technology.

As illustrated in FIG. 4, according to an embodiment of the disclosed technology, the screw head may be formed integrally with the sensor casing 200 by injection molding or molding such as die casting in such a manner that the screw head 311 is inserted at the time of manufacturing the lower portion of the sensor casing 200.

The injection molding is a plastic molding process that forms the center of the method for forming thermoplastic resin, and is a processing method of injecting a plastic material melted by heating into a mold to solidify or cure it and form a molded article. It is advantageous for mass production because the production speed is fast by the compression molding method.

The die casting is a precise casting method of injecting a molten metal into a precisely machined metal mold to exactly match the required cast shape, thereby obtaining the same casting as the mold. The die casting is characterized in that mass production is possible since there is little need for finishing due to accurate dimensions.

Since the screw head 311 is formed integrally with the sensor casing 200 so as to be inserted thereinto through the molding method as described above, the adhesion and durability of the tire sensor according to the disclosed technology can be enhanced.

According to an embodiment of the disclosed technology, the lower surface of the sensor casing 200 and one or more surfaces of the fixing screw 310 may be additionally coated with an adhesive, a sticking agent, or a sealant to prevent air from leaking out of the contact surface between the fixing screw 310 and the inner surface of the tire tread.

The sealant can be a rubbery material or a high-viscosity liquid rubber composition. For example, the sealant can be a material that is used for a joint gap between members such as window frames to absorb and relieve the expansion, vibration, and deformation between members in addition to functions of air-tightness and water-tightness.

When the adhesive, the sticking agent, or the sealant is additionally coated, it is possible to further strengthen the durability of attachment of the sensor in addition to the durability enhancement through the application of the rotary screwing action according to the embodiment of the disclosed technology.

Figure 5:
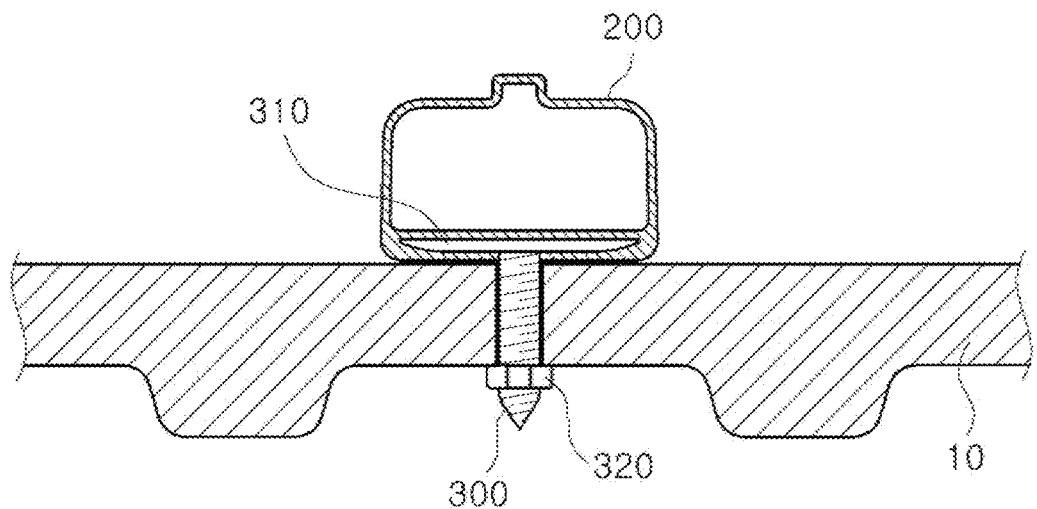
FIG. 5 is a cross-sectional view illustrating a tire sensor in which a screw body of a fixing screw is fastened to a female screw through the tread of the tire according to an embodiment of the disclosed technology.

As illustrated in FIG. 5, according to an embodiment of the disclosed technology, the fixing screw 310 may be formed such that the screw body 312 completely passes through the tread 10 to further enhance the durability of attachment of the tire sensor.

In this case, the sensor fixture 300 may further include a female screw 320 on the outer surface of the tread 10 to ensure more reliable durability of attachment. The female screw 320 may be fastened to a portion of the screw body 312 protruding after passing through the tread 10.

The fixing screw 310 and the female screw 320 may be made of metal or plastic having high hardness instead of metal.

Figure 6:
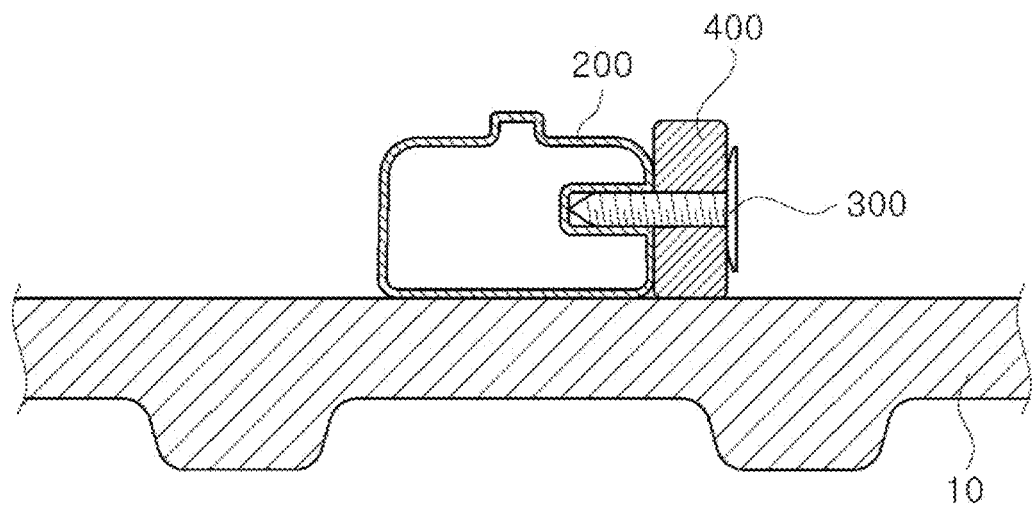
FIG. 6 is a cross-sectional view illustrating a tire sensor in which a sensor casing is fixedly attached by a fixing screw support according to an embodiment of the disclosed technology.

Unlike the above-mentioned embodiments of the disclosed technology, FIG. 6 illustrates a tire sensor fixed in a screwing manner further including a fixing screw support 400 according to an embodiment of the disclosed technology. In this case, after the fixing screw support 400 is preliminarily attached to the inner surface of the tread, the sensor module 100 and the sensor casing 200 are fixedly attached to the fixing screw support 400 through the sensor fixture 300.

Figure 7:
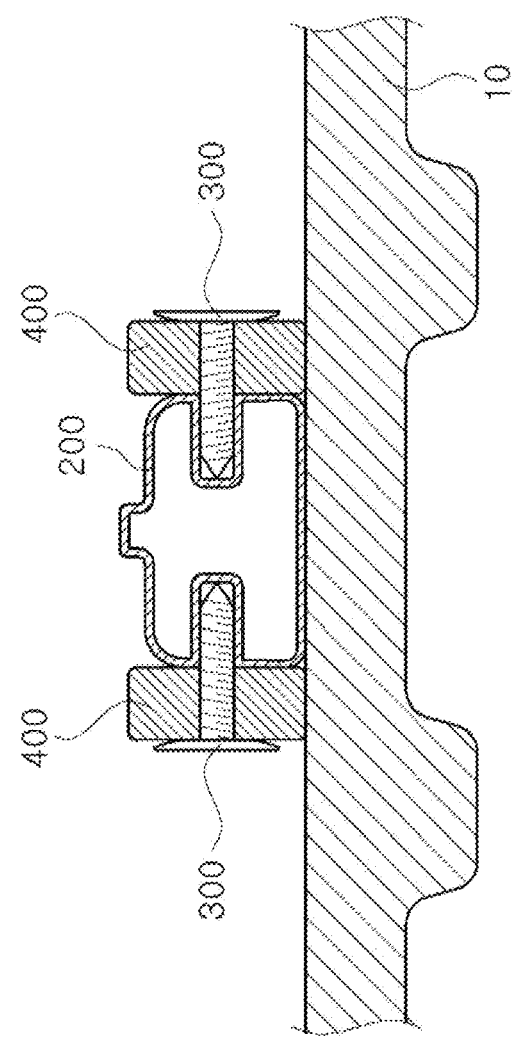
FIG. 7 is a cross-sectional view illustrating a tire sensor in which a sensor casing is fixedly attached by two or more fixing screw supports according to an embodiment of the disclosed technology.

As illustrated in FIG. 7, the fixing screw support 400 is not a single fixing screw support, but may consist of two or more fixing screw supports to further increase the effect of the invention. The fixing screw support 400 may be made of rubber, plastic, metal, or the like selected as necessary.

The fixing screw support 400 may be attached to the inner surface of the tire tread with an adhesive, a sticking agent, or a sealant, or by rubber heating and curing.

The curing is a process of curing rubber by adding sulfur thereto at a high temperature. Natural rubber is viscous and tends to be deformed in warmer places and broken in cold places. However, when the polymer molecules of the rubber are bridge-bonded to the sulfur atoms, the rubber becomes much harder and the viscosity thereof is reduced, with the consequence that its resistance and durability are also increased.

Accordingly, the cured rubber can be applied in various categories, and in particular, one of them is to seal the gap between moving parts, which plays a key role in the development of industrial machinery. Therefore, the cured rubber may be the most suitable for attaching the fixing screw support 400 to the inner surface of the tire tread.

When the fixing screw support 400 is attached and the sensor is attached therethrough, a manufacturing process may be added. However, when the sensor is attached through the fixing screw support 400, there is no risk of damaging the wire of the tire reinforcing belt as compared with when the fixing screw 310 is directly inserted into the tread.

According to another embodiment of the disclosed technology, there is provided a tire sensor for detecting tire conditions in real time. The tire sensor may be any one of the tire sensors fixed in a screwing manner according to the above-mentioned embodiments of the disclosed technology.

As described above, according to the embodiments of the disclosed technology, the tire sensor is fixedly attached to the inner surface of the tire in a screwing manner, unlike the existing attachment method of the sensor to the inner surface of the tire. Thus, it is possible to prevent the detachment of the sensor in advance by ensuring the durability of attachment of the sensor.

Therefore, it is possible to stably perform the function of the tire sensor itself for detecting the air pressure of the tire and to implement a technology for preventing the secondary accident, which may occur due to the detachment of the sensor, in advance to ensure the safety and reliability of the tire having the sensor fixed thereto.

As is apparent from the above description, the disclosed technology provides the tire sensor fixed in a screwing manner to ensure the strong durability of the sensor fixed on the tire, thereby having a first effect of securing the function of the tire sensor itself during the traveling of the vehicle and a second effect of preventing the secondary accident of the vehicle, which may occur due to the detachment of the sensor, in advance.

The disclosed technology is not limited to the above effects, and it should be understood that the disclosed technology includes all effects which can be inferred from the detailed description of the disclosed technology or the configuration of the invention defined by the appended claims.

The above-mentioned embodiments of the present invention are merely examples, and it will be understood by those skilled in the art that various modifications may be made without departing from the spirit and scope or essential features of the invention. Therefore, it should be understood that the embodiments described above are for purposes of illustration only in all aspects and are not intended to limit the scope of the present invention. For example, each component described in a single form may be implemented in a distributed form, and similarly, components described in the distributed form may be implemented in a combined form.

The scope of the present invention is defined by the appended claims, and it should be construed that all modifications or variations derived from the meaning, scope, and equivalent concept of the claims fall within the scope of the invention.

What is claimed is:

1. A tire sensor configured to be fixed to a tire in a screwing manner, comprising:
    a sensor module configured to be attached to an inner surface of a tread of the tire to detect conditions of the tire;
    a sensor casing formed to surround the sensor module; and
    a sensor fixture comprising a fixing screw to attach the sensor casing to the inner surface of the tread of the tire,
    wherein the fixing screw is configured to be attached by turning in a screwing manner to fixedly attach the sensor casing to the inner surface of the tread of the tire, and
    wherein the fixing screw has a screw head at one end and a threaded screw body at the other end, such that the screw body is configured to pierce the tread of the tire while the screw head remains outside of the tread of the tire.

2. The tire sensor according to claim 1, wherein the screw head is attached to a lower surface of the sensor casing.

3. The tire sensor according to claim 1, wherein the fixing screw has the screw head inserted into the sensor casing such that the fixing screw is formed integrally with the sensor casing.

4. The tire sensor according to claim 1, wherein one of an adhesive, a sticking agent, and a sealant is additionally coated on a lower surface of the sensor casing and a surface of the sensor fixture.

5. The tire sensor according to claim 1, wherein the screw body completely passes through the tread of the tire.

6. The tire sensor according to claim 5, wherein:
    the sensor fixture further comprises a female screw on an outer surface of the tread of the tire; and
    the female screw is configured to be fastened to the screw body of the fixing screw protruding through the tread.

7. The tire sensor according to claim 1, wherein the screw head is formed to have one of circular, elliptical, polygonal, star-like, and serrated shapes, such that the sensor casing fits in with the fixing screw when the fixing screw is inserted into or removed from the tread of the tire.

8. The tire sensor according to claim 1, wherein the sensor fixture is formed of metal or high-hardness plastic.

9. The tire sensor according to claim 1, wherein the fixing screw has a thickness dimension of 1 mm to 5 mm.

10. The tire sensor according to claim 1, further comprising a fixing screw support configured to be attached to the inner surface of the tread of the tire such that,
    after the fixing screw support is preliminarily attached to the inner surface of the tread of the tire, the sensor casing is fixedly attached to the fixing screw support by the fixing screw of the sensor fixture.

11. The tire sensor according to claim 10, wherein the fixing screw support comprises two or more fixing screw supports formed on sides of the sensor casing.

12. The tire sensor according to claim 10, wherein the fixing screw support is configured to be attached to the inner surface of the tread of the tire using one of an adhesive, a sticking agent, and a sealant.

13. The tire sensor according to claim 10, wherein the fixing screw support is configured to be attached to the inner surface of the tread of the tire by rubber heating and curing.

14. The tire sensor according to claim 1, wherein the sensor is configured to measure one or more of an air pressure, temperature and acceleration of the tire.

15. A tire having a tire sensor fixedly attached in a screwing manner therein for detecting tire conditions, wherein the tire sensor comprises:
- a sensor module attached to an inner surface of a tread of the tire to detect conditions of the tire;
- a sensor casing formed to surround the sensor module; and
- a sensor fixture comprising a fixing screw attaching the sensor casing to the inner surface of the tread of the tire,
- wherein the fixing screw has a screw head at one end and a threaded screw body at the other end, such that the screw body is screwed at least partly into the tread of the tire to fixedly attach the sensor casing to the inner surface of the tread of the tire, while the screw head remains outside of the tread of the tire.

16. The tire of claim 15, wherein the screw head is attached to a lower surface of the sensor casing.

17. The tire of claim 15, wherein the screw head is inserted into the sensor casing such that the fixing screw is formed integrally with the sensor casing.

18. The tire of claim 15, wherein one of an adhesive, a sticking agent, and a sealant is additionally coated on a lower surface of the sensor casing and a surface of the sensor fixture.

19. The tire of claim 15, wherein the screw body completely passes through the tread of the tire.

20. The tire of claim 19, wherein:
- the sensor fixture further comprises a female screw on an outer surface of the tread of the tire; and
- the female screw is fastened to the screw body of the fixing screw protruding through the tread.

\* \* \* \* \*